US008191459B2

(12) United States Patent
Bauer et al.

(10) Patent No.: US 8,191,459 B2
(45) Date of Patent: Jun. 5, 2012

(54) HIGH PRESSURE PUMP, IN PARTICULAR FOR A FUEL INJECTION SYSTEM OF AN INTERNAL COMBUSTION ENGINE

(75) Inventors: Peter Bauer, Schwieberdingen (DE); Markus Koch, Stuttgart (DE); Gernot Repphun, Balingen (DE); Wolfram Rittmannsberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1015 days.

(21) Appl. No.: 12/096,090

(22) PCT Filed: Jan. 26, 2007

(86) PCT No.: PCT/EP2007/050762

§ 371 (c)(1), (2), (4) Date: Jun. 4, 2008

(87) PCT Pub. No.: WO2007/096224

PCT Pub. Date: Aug. 30, 2007

(65) Prior Publication Data

US 2008/0295807 A1 Dec. 4, 2008

(30) Foreign Application Priority Data

Feb. 20, 2006 (DE) ......................... 10 2006 007 697
Sep. 6, 2006 (DE) ......................... 10 2006 041 673

(51) Int. Cl.
*F16J 1/10* (2006.01)
*F01B 31/10* (2006.01)

(52) U.S. Cl. ............................................ 92/129; 92/155

(58) Field of Classification Search .............. 92/72, 129, 92/140, 155
See application file for complete search history.

(56) References Cited

U.S. PATENT DOCUMENTS

| | | | | |
|---|---|---|---|---|
| 3,000,319 | A | 9/1961 | Tuck | |
| 4,828,728 | A | 5/1989 | Dimigen | |
| 4,915,595 | A | 4/1990 | Nelson et al. | |
| 6,216,583 | B1 * | 4/2001 | Klinger et al. | 92/129 |
| 7,497,157 | B2 * | 3/2009 | Aoki et al. | 92/129 |
| 2006/0216157 | A1 | 9/2006 | Breuer et al. | |
| 2007/0116583 | A1 | 5/2007 | Aoki | |

FOREIGN PATENT DOCUMENTS

| | | | |
|---|---|---|---|
| DE | 29 26 080 | A1 | 1/1981 |
| DE | 36 24 134 | A1 | 1/1988 |
| DE | 39 19 267 | A1 | 12/1989 |
| DE | 199 07 311 | A1 | 8/2000 |
| EP | 1 413 749 | A2 | 4/2004 |
| WO | WO 2004/111450 | A1 | 12/2004 |
| WO | 2005068823 | A1 | 7/2005 |
| WO | WO 2005068822 | A1 * | 7/2005 |

* cited by examiner

*Primary Examiner* — Michael Leslie
(74) *Attorney, Agent, or Firm* — Ronald E. Greigg

(57) ABSTRACT

The high pressure pump includes a drive shaft with at least one cam or eccentric and at least one pump element with a pump piston driven in the reciprocating direction by the cam or eccentric on the driveshaft in a reciprocating motion. A support element is arranged between the pump piston and the cam or eccentric on the driveshaft and also a roller running on the cam or eccentric is mounted to rotate therein. A support for the roller in the direction of rotation is arranged adjacent to the same in the direction of the rotational axis of the roller. The roller and/or the support include a surface with high wear resistance at least in the contact region between the roller and the support.

33 Claims, 4 Drawing Sheets

HIGH PRESSURE PUMP, IN PARTICULAR FOR A FUEL INJECTION SYSTEM OF AN INTERNAL COMBUSTION ENGINE

CROSS-REFERENCE TO RELATED APPLICATION

This application is a 35 USC 371 application of PCT/EP 2007/050762 filed on 26 Jan. 2007.

BACKGROUND OF THE INVENTION

1. Prior Art Field of the Invention

The invention is based on a high-pressure pump, in particular for a fuel injection system of an internal combustion engine.

2. Description of the Prior Art

One such high-pressure pump is known from German Patent Disclosure DE 199 07 311 A1. This high-pressure pump has a drive shaft with at least one cam or eccentric element. The high-pressure pump furthermore has at least one pump element, which has a pump piston that is driven in a reciprocating motion by the cam or eccentric element of the drive shaft. A support element is disposed between the pump piston and the cam or eccentric element, and a roller that rolls on the cam or eccentric element of the drive shaft is rotatably supported in the support element. It has been found that in operation of the high-pressure pump, forces acting in the direction of the rotational axis of the roller also act on the roller, and as the roller begins to roll on adjoining components, wear can occur on the roller and/or these components and leads to increased friction between the roller and the adjacent components. This increased friction hinders the rotary motion of the roller, and as a result slip can occur between the roller and the cam or eccentric element of the drive shaft, which once again leads to wear.

SUMMARY AND ADVANTAGES OF THE INVENTION

The high-pressure pump according to the invention has the advantage over the prior art that wear to the roller and/or the bracing means is reduced, and thus increased friction there is avoided.

BRIEF DESCRIPTION OF THE DRAWINGS

A plurality of exemplary embodiments of the invention are shown in the drawings and described in further detail in the ensuing description.

DESCRIPTION OF THE PREFERRED EMBODIMENTS

Figure 1:
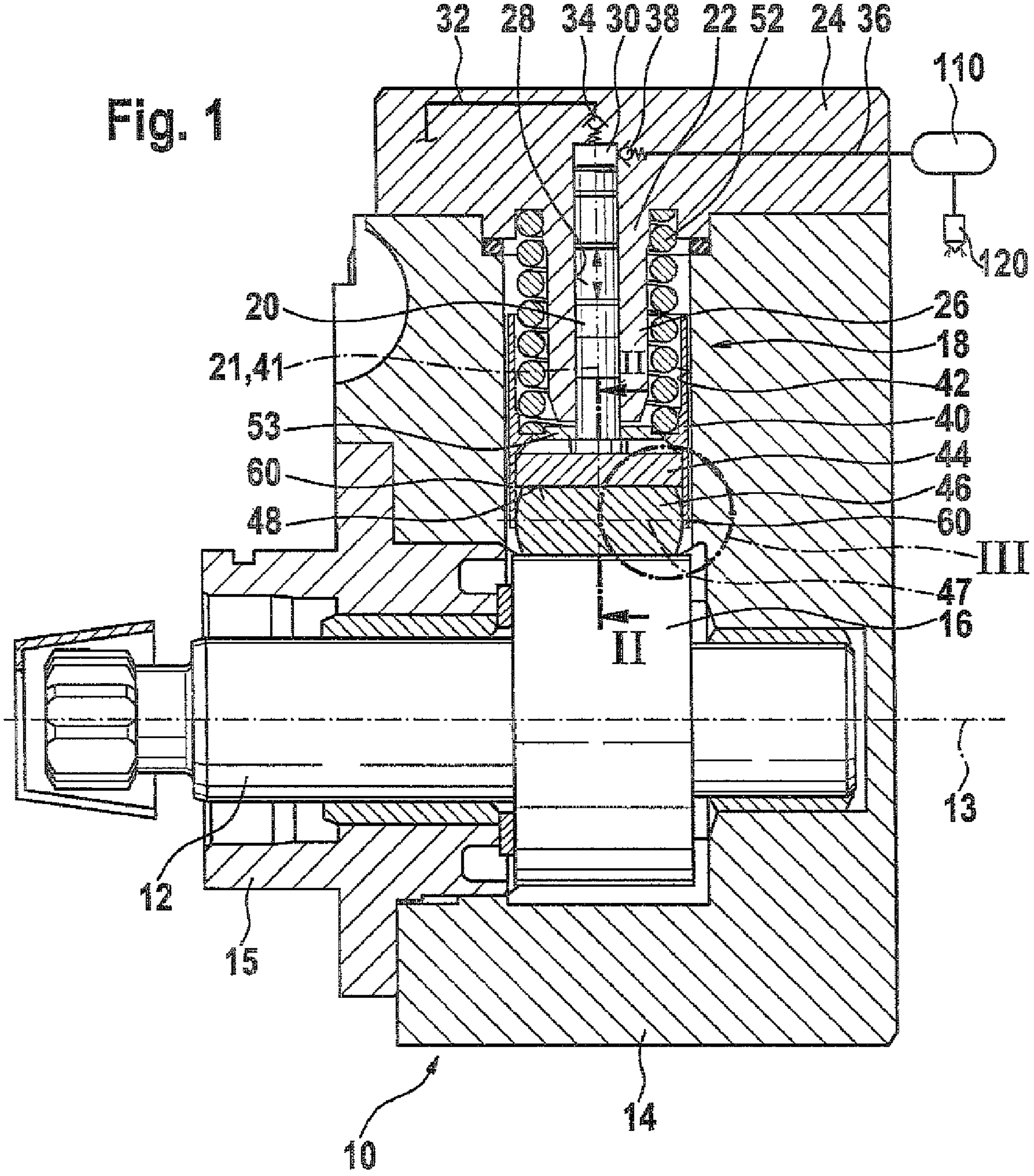
FIG. 1 shows a high-pressure pump for a fuel injection system of an internal combustion engine in a longitudinal section.
Figure 2:
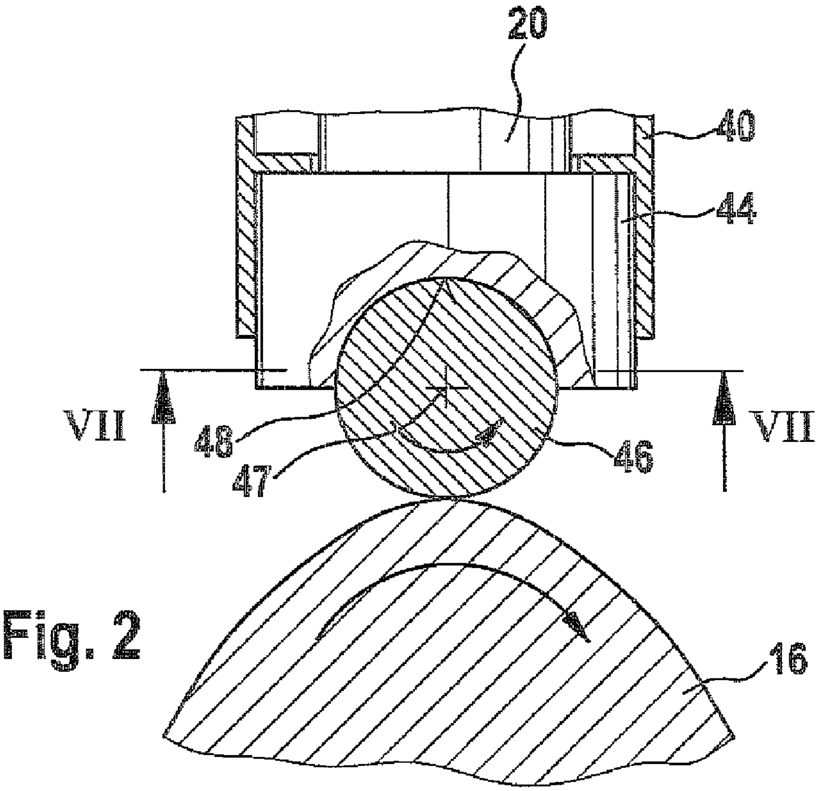
FIG. 2 shows the high-pressure pump in a cross section taken along the line II-II in FIG. 1.

In FIG. 1 through 6, a high-pressure pump for a fuel injection system of an internal combustion engine is shown. The high-pressure pump has a multi-part pump housing 10, in which a drive shaft 12 driven to rotate by the engine is disposed. The drive shaft 12 is rotatably supported for instance via two bearing points, spaced apart from one another in the direction of the rotational axis 13 of the drive shaft 12. The bearing points can be disposed at various parts of the pump housing 10; for instance, a first bearing point can be disposed in a base body 14 of the pump housing 10, and a second bearing point can be disposed in a flange part 15 connected to the base body 14.

In a region located between the two bearing points, the drive shaft 12 has at least one cam 16 or portion embodied eccentrically to its rotational axis 13; the cam 16 can also be embodied as a multiple cam. The high-pressure pump has at least one or more pump elements 18, disposed in the housing 10, each having a respective pump piston 20 that is driven by the cam 16 of the drive shaft 12 in a reciprocating motion in an at least approximately radial direction to the rotational axis 13 of the drive shaft 12. One pump housing part 22, connected to the base body 14 and embodied as a cylinder head, is provided in the region of each pump element 18. The pump housing part 22 has a flange 24, resting on an outside of the base body 14, and an at least approximately cylindrical extension 26, which protrudes through an opening in the base body 14 toward the drive shaft 12 and has a smaller diameter than the flange 24. The pump piston 20 is guided tightly displaceably in a cylinder bore 28, embodied in the extension 26, in the pump housing part 22, and with its face end remote from the drive shaft 12, it defines a pump work chamber 30 in the cylinder bore 28. The cylinder bore 28 may extend to inside the flange 24, in which the pump work chamber 30 is then disposed. The pump work chamber 30, via a fuel supply conduit 32 extending in the pump housing 10, has a communication with a fuel supply, such as a feed pump. At the orifice of the fuel supply conduit 32 into the pump work chamber 30, there is an inlet valve 34 that opens into the pump work chamber 30. Furthermore, via a fuel outlet conduit 36 extending in the pump housing 10, the pump work chamber 30 is in communication with an outlet, which is in communication for instance with a high-pressure reservoir 110. One or preferably more injectors 120, disposed at the cylinders of the engine and through which fuel is injected into the cylinders of the engine, are in communication with the high-pressure reservoir 110. At the orifice of the fuel outlet conduit 36 into the pump work chamber 30, there is an outlet valve 38 that opens out of the pump work chamber 30.

A tappet 40 is disposed between the pump piston 20 and the cam 16 of the drive shaft 12, and by way of this tappet, the pump piston 20 is braced at least indirectly on the cam 16 of the drive shaft 12. The tappet 40 is embodied hollow-cylindrically, with a round outside cross section, and is guided displaceably in a bore 42 of the base body 14 of the pump housing 10 in the direction of the longitudinal axis 21 of the pump piston 20. The longitudinal axis 41 of the tappet 40 is thus at least substantially identical to the longitudinal axis 21 of the pump piston 20. In the tappet 40, a support element 44, in which a roller 46 that rolls on the cam 16 of the drive shaft 12 is rotatably supported, is inserted into the end region, toward the drive shaft 12, of the tappet 40. The rotational axis 47 of the roller 46 is at least approximately parallel to the rotational axis 13 of the drive shaft 12. The support element 44, on its side toward the drive shaft 12, has an indentation 48, in which the roller 46 is rotatably supported. The support element 44 and the tappet 40 may also be embodied in one piece.

The tappet 40 or the pump piston 20 is engaged by a prestressed restoring spring 52, which is braced on the pump housing part 22. By means of the restoring spring 52, the pump piston 20 and the tappet 40 are urged toward the cam 16 of the drive shaft 12, so that the contact of the roller 44 with the cam 16 is assured, even in the intake stroke, oriented toward the drive shaft 12, of the pump piston 20 and even at high rpm of the drive shaft 12. The pump piston 20 may be coupled with the tappet 40, at least in the direction of the longitudinal axis 21 of the pump piston. Alternatively, it is possible for the pump piston 20 not to be connected to the tappet 40; in that case, the contact of the pump piston 20 with the tappet 40 is assured by the restoring spring 52. It may be provided that the restoring spring 52, for instance via a spring plate 53, engages a base of enlarged diameter of the pump piston 20, and this base then is kept in contact with a flange, protruding inward from the jacket of the tappet 40, and this flange is in turn kept in contact with the support element 44, so that the entire combination comprising a pump piston 20, tappet 40 and support element 44 with the roller 46 is urged toward the cam 16 of the drive shaft 12.

Laterally beside the roller 46 in the direction of the rotational axis 47, a bracing means 60 for the roller is provided, which prevents the roller 46 from moving in the direction of its rotational axis 47 out of the support element 44. The roller 46 may be embodied with a convex curvature on its side faces 56 facing toward the bracing means 60, for instance being at least approximately spherically curved. The face of the bracing means 60 facing toward the side faces 56 of the roller may be at least approximately plane or curved, in particular curved in concave fashion, for instance as the portion of a circular cylinder as shown in FIG. 7. The concave curvature of the bracing means 60 thus exists only in sectional planes that are perpendicular to the longitudinal axis 41 of the tappet 40 as in FIG. 7, while the bracing means 60 has no curvature in sectional planes that are parallel to the longitudinal axis 41, as shown in FIGS. 3 through 6. The bracing means 60 may, as shown in FIG. 7, be embodied as a ring surrounding the roller 46, or it may be disposed only laterally beside the side faces 56 of the roller 46.

The geometry of the side faces 56 of the roller 46 and of the bracing means 60 is optimized for the sake of minimal pressure per unit of surface area and maximal cooling, so that the tribological stress on the roller 46 and the bracing means 60 is minimized. If the bracing means 60 is embodied in plane fashion, as is shown in the left half of FIG. 7, then the radius R of the convex curvature of the side faces 56 of the roller 46 amounts for instance to approximately 50 to 500 mm, preferably approximately 90 to 300 mm. If the bracing means 60 is embodied with a concave curvature with a radius R1, as shown in the right half of FIG. 7, then the radius R of the convex curvature of the side faces 56 of the roller 46 amounts for instance to approximately 70 to 100%, and preferably approximately 85 to 95%, of the radius R1 of the bracing means 60.

It is provided that the roller 46 and/or the bracing means 60 has a surface with high wear resistance, at least in the contact region between the roller 46 and the bracing means 60. It may be provided that the entire roller 46 comprises a material with high wear resistance, such as a ceramic material or a hard metal. Alternatively or in addition, it may also be provided that the bracing means 60 entirely comprises a material with high wear resistance, such as a ceramic material or a hard metal.

Figure 3:
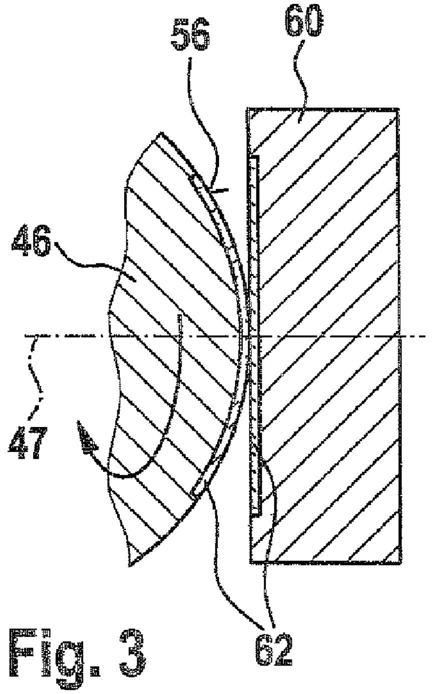
FIG. 3 shows a detail, marked III in FIG. 1, of the high-pressure pump in an enlarged view in a first exemplary embodiment.

Alternatively, it is provided that the roller 46 itself comprises a material with low wear resistance, and in an exemplary embodiment shown in FIG. 3, it is provided with a coating 62 comprising a material with high wear resistance on each of its side faces 56 facing toward the bracing means 60. Alternatively or in addition to the coating of the side faces 56 of the roller, the bracing means 60 may also be provided with a coating 62 comprising a material with high wear resistance. The coating 62 may comprise a ceramic material, a hard metal, or a hydrocarbon compound, in particular a diamond like hydrocarbon compound. Alternatively, the coating 62 may comprise a metal oxide or a metal nitride, such as titanium nitride. The coating 62 may be produced by nitrocarburizing.

Figure 4:
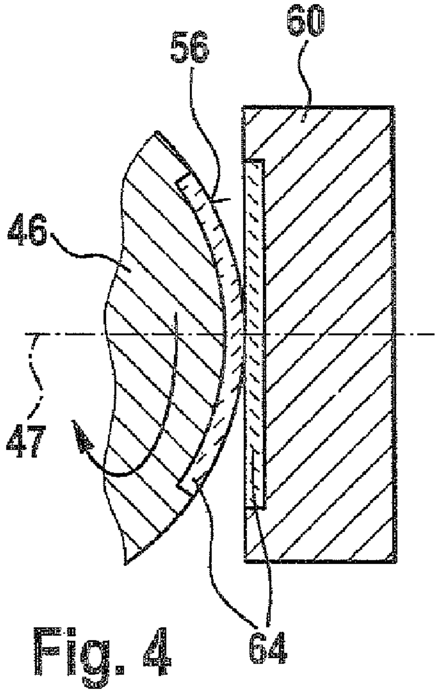
FIG. 4 shows the detail III of the high-pressure pump in a second exemplary embodiment.

It is furthermore alternatively provided that the roller 46 itself comprises a material of low wear resistance, and in an exemplary embodiment shown in FIG. 4, it has an insert 64 comprising a material with high wear resistance in each of its side faces 56 facing toward the bracing means 60. The insert 64 can then be embodied as a thin plate, which is inserted into a corresponding indentation in the side face 56 of the roller 46. Alternatively or in addition to being inserted into the roller 46, an insert 64 of a material with high wear resistance can be inserted into the bracing means 60, in its regions facing toward the side faces 56 of the roller 46. The insert 64 may comprise a material of the kind mentioned above for the coating 62.

Figure 5:
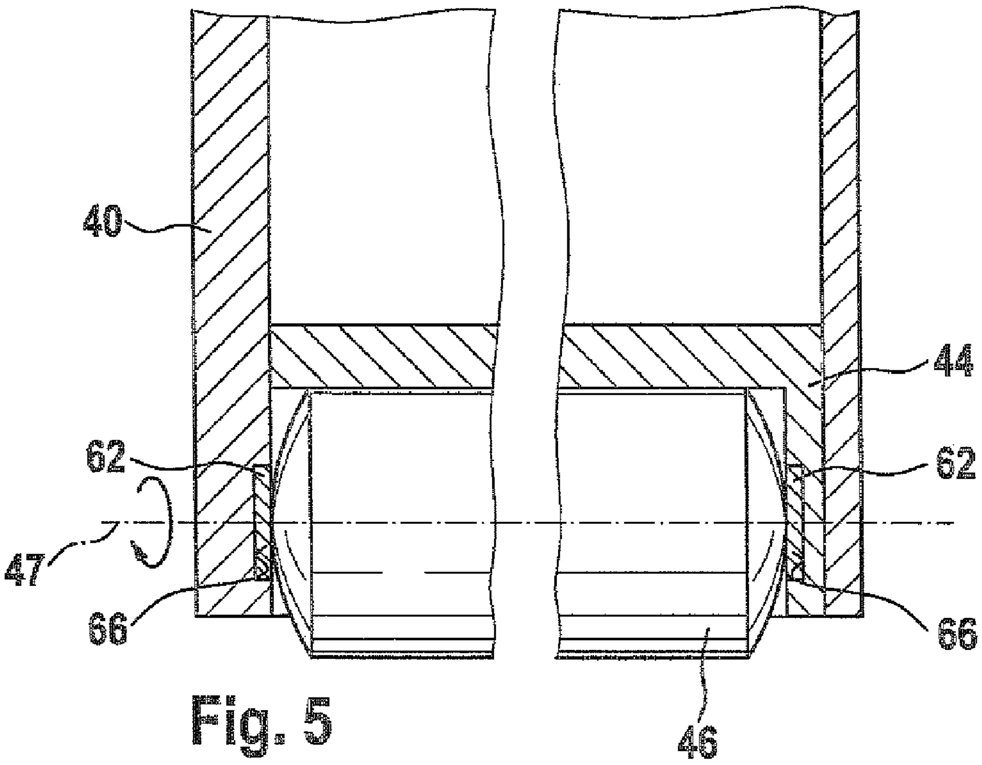
FIG. 5 shows the detail III of the high-pressure pump in a third exemplary embodiment.

It may also be provided that the coating 62, in an exemplary embodiment shown in FIG. 5, is mounted directly on the tappet 40, as shown in the left half of FIG. 5, or on the support element 44, as shown in the right half of FIG. 5, in particular on an inner wall of the tappet 40 or support element 44, that laterally adjoins the roller 46 in the direction of its rotational axis 47. It may be provided that in the inner wall of the tappet 40 or support element 44, there is at least one groove 66 into which the coating 62 is placed, and in the at least one groove 66, good adhesion of the coating 62 to the tappet 40 or the support element 44 is assured. The coating 62 may for instance be applied by injection molding, in the form of injected ceramic.

Figure 6:
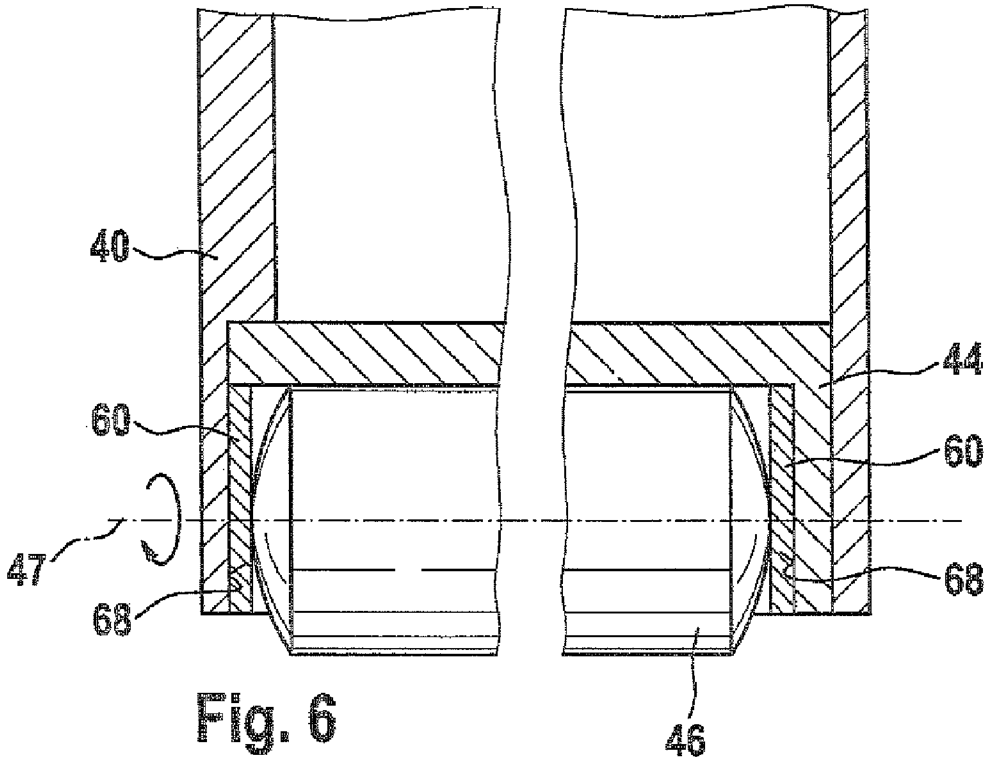
FIG. 6 shows part of the high-pressure pump in a fourth exemplary embodiment.
Figure 7:
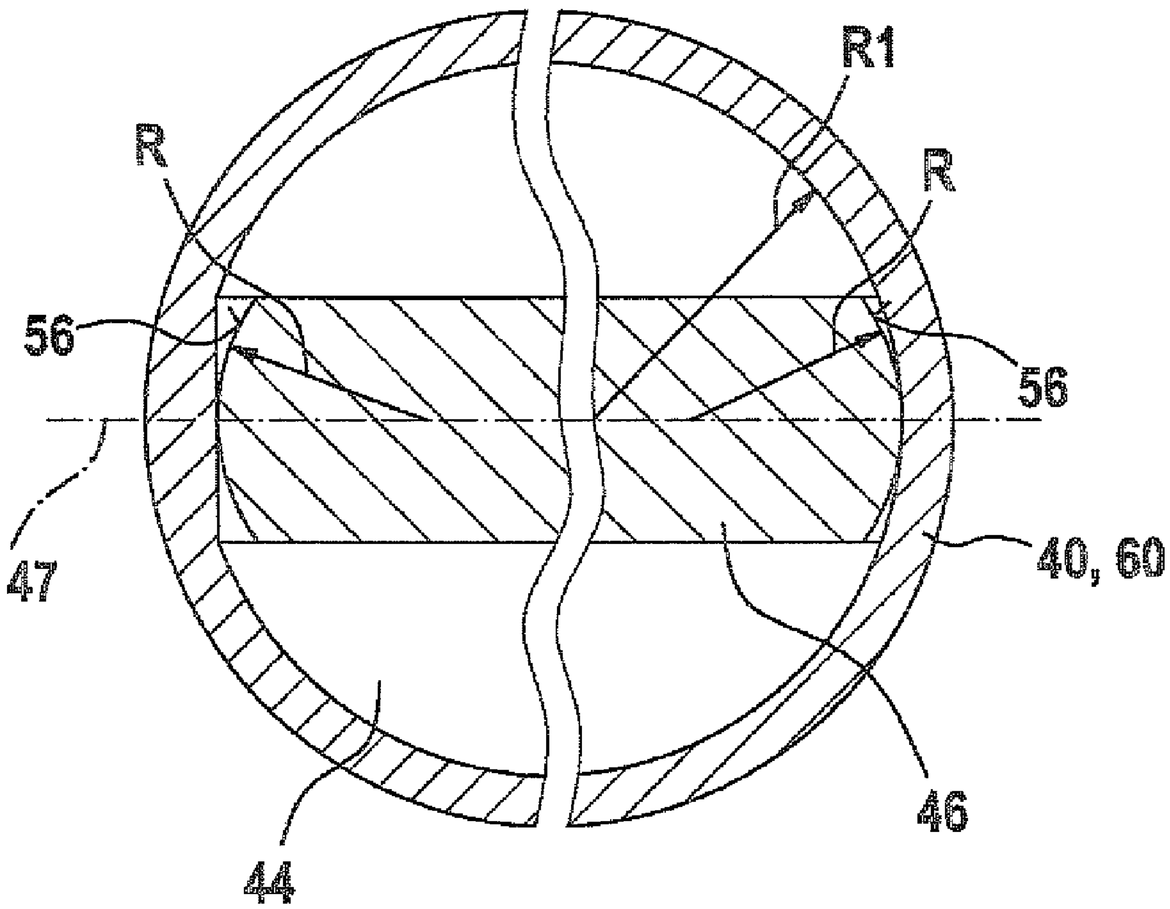
FIG. 7 shows a detail of the high-pressure pump, in a section taken along the line VII-VII in FIG. 2.

The bracing means 60 may be formed by a part of the tappet 40 or support element 44, or by a separate component, in particular annular, that is inserted into the tappet 40, as shown in the left half of FIG. 6, or into the support element 44, as shown in the right half of FIG. 6; this component is then disposed between the roller 46 and the tappet 40 or support element 44 as applicable. The bracing means 60 may be inserted, for instance being press-fitted, into the tappet 40 or support element 44. In an exemplary embodiment shown in FIG. 6, a receptacle 68 for the bracing means 60 may be embodied in the tappet 40. The receptacle 68 can be formed for instance by a region of enlarged inside diameter of the inner wall, surrounding the roller 46, of the tappet 40. The wall thickness of the tappet 40 may be reduced in the region of the receptacle 68, compared to the remaining tappet 40 or support element 44. An identically embodied receptacle 68 for the bracing means 60 may alternatively, as shown in the right half of FIG. 6, be embodied in the support element 44 as well. The bracing means may be embodied as described above; that is, it may itself comprise a material with high wear resistance, or it may have a coating or an insert that comprises a material with high wear resistance.

In the intake stroke of the pump piston 20, in which this pump piston moves radially inward, the pump work chamber 30 is filled with fuel through the fuel supply conduit 32, with the inlet valve 34 open and the outlet valve 38 closed. In the pumping stroke of the pump piston 20, in which the pump piston moves radially outward, fuel is pumped by the pump piston 20 at high pressure through the fuel outlet conduit 36, with the outlet valve 48 open, to the high-pressure reservoir 110 and the inlet valve 34 is closed.

The foregoing relates to the preferred exemplary embodiment of the invention, it being understood that other variants and embodiments thereof are possible within the spirit and scope of the invention, the latter being defined by the appended claims.

The invention claimed is:

1. A high-pressure pump, in particular for a fuel injection system of an internal combustion engine, comprising:

a drive shaft;

at least one cam or eccentric element being driven by the drive shaft, at least one pump element having a pump piston which is driven in a reciprocating motion by the cam or eccentric element;

a support element disposed between the pump piston and the cam or eccentric element;

a tappet disposed between said support element and said pump piston;

said support element disposed within said tappet;

a roller rotatably supported in the support element and rolling on the cam or eccentric element;

a bracing means for the roller disposed within said support element in a direction of a rotational axis of the roller and adjacent to the roller, the roller and/or the bracing means, at least in a contact region between the roller and the bracing means, has a surface with high wear resistance, the roller, on its side face facing toward the bracing means, is embodied with a convex curvature, wherein the convex curvature of the side face of the roller is at least spherically shaped, the bracing means is embodied with a concave curvature, and that a radius (R) of curvature of the side face of the roller is approximately 70 to 100% of a radius (R1) of curvature of the bracing means.

2. The high-pressure pump according to claim 1, wherein the roller and/or the bracing means is provided in the contact region with a coating of a material with high wear resistance.

3. The high-pressure pump according to claim 1, further comprising an insert of a material with high wear resistance is inserted into the roller and/or the bracing means.

4. The high-pressure pump according to claim 2, wherein the coating comprises a ceramic material.

5. The high-pressure pump according to claim 3, wherein the insert comprises a ceramic material.

6. The high-pressure pump according to claim 2, wherein the coating comprises a metal oxide or metal nitride.

7. The high-pressure pump according to claim 3, wherein the insert comprises a metal oxide or metal nitride.

8. The high-pressure pump according to claim 6, wherein the coating comprises titanium nitride.

9. The high-pressure pump according to claim 7, wherein the insert comprises titanium nitride.

10. The high-pressure pump according to claim 2, wherein the coating comprises a hydrocarbon compound.

11. The high-pressure pump according to claim 3, wherein the insert comprises a hydrocarbon compound.

12. The high-pressure pump according to claim 1, wherein the roller and/or the bracing means comprises a ceramic material.

13. The high-pressure pump according to claim 1, wherein the bracing means is embodied as a ring surrounding the roller.

14. The high-pressure pump according to claim 1, wherein the bracing means is inserted into the support element or into a tappet that receives the support element.

15. The high-pressure pump according to claim 1, wherein the radius (R) of curvature of the side face of the roller is approximately 85-95% of a radius (R1) of curvature of the bracing means.

16. The high-pressure pump according to claim 10, wherein the coating comprises a diamond-like hydrocarbon compound.

17. The high-pressure pump according to claim 11, wherein the insert comprises a diamond-like hydrocarbon compound.

18. A high-pressure pump, in particular for a fuel injection system of an internal combustion engine, comprising:

a drive shaft;

at least one cam or eccentric element being driven by the drive shaft, at least one pump element having a pump piston which is driven in a reciprocating motion by the cam or eccentric element;

a support element disposed between the pump piston and the cam or eccentric element;

a tappet disposed between said support element and said pump piston;

said support element disposed within said tappet;

a roller rotatably supported in the support element and rolling on the cam or eccentric element;

a bracing means for the roller disposed within said support element in a direction of a rotational axis of the roller and adjacent to the roller, the roller and/or the bracing means, at least in a contact region between the roller and the bracing means, has a surface with high wear resistance, the roller, on its side face facing toward the bracing means, is embodied with a convex curvature, the convex curvature of the side face of the roller is at least spherically shaped, wherein the bracing means is embodied as at least approximately plane, and that a radius (R) of curvature of the side face of the roller is approximately 90 to 300 mm.

19. The high-pressure pump according to claim 18, wherein the roller and/or the bracing means is provided in the contact region with a coating of a material with high wear resistance.

20. The high-pressure pump according to claim 18, further comprising an insert of a material with high wear resistance is inserted into the roller and/or the bracing means.

21. The high-pressure pump according to claim 19, wherein the coating comprises a ceramic material.

22. The high-pressure pump according to claim 20, wherein the insert comprises a ceramic material.

23. The high-pressure pump according to claim 19, wherein the coating comprises a metal oxide or metal nitride.

24. The high-pressure pump according to claim 20, wherein the insert comprises a metal oxide or metal nitride.

25. The high-pressure pump according to claim 23, wherein the coating comprises titanium nitride.

26. The high-pressure pump according to claim 24, wherein the insert comprises titanium nitride.

27. The high-pressure pump according to claim 19, wherein the coating comprises a hydrocarbon compound.

28. The high-pressure pump according to claim 20, wherein the insert comprises a hydrocarbon compound.

29. The high-pressure pump according to claim 18, wherein the roller and/or the bracing means comprises a ceramic material.

30. The high-pressure pump according to claim 18, wherein the bracing means is embodied as a ring surrounding the roller.

31. The high-pressure pump according to claim 18, wherein the bracing means is inserted into the support element or into a tappet that receives the support element.

32. The high-pressure pump according to claim 27, wherein the coating comprises a diamond-like hydrocarbon compound.

33. The high-pressure pump according to claim 28, wherein the insert comprises a diamond-like hydrocarbon compound.

* * * * *